(12) United States Patent
Sano

(10) Patent No.: US 7,744,098 B2
(45) Date of Patent: Jun. 29, 2010

(54) VEHICLE STABILIZER SYSTEM

(75) Inventor: Katsuyuki Sano, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/282,952

(22) PCT Filed: Mar. 8, 2007

(86) PCT No.: PCT/JP2007/055168

§ 371 (c)(1),
(2), (4) Date: Sep. 15, 2008

(87) PCT Pub. No.: WO2007/114018

PCT Pub. Date: Oct. 11, 2007

(65) Prior Publication Data

US 2009/0091094 A1 Apr. 9, 2009

(30) Foreign Application Priority Data

Mar. 20, 2006 (JP) ............................. 2006-077209

(51) Int. Cl.
*B60G 17/016* (2006.01)
(52) U.S. Cl. .................................................. 280/5.511
(58) Field of Classification Search ............. 280/5.502, 280/5.506, 5.507, 5.511, 124.106, 124.149, 280/124.152
See application file for complete search history.

(56) References Cited

U.S. PATENT DOCUMENTS

| | | | | |
|---|---|---|---|---|
| 5,251,926 A * | 10/1993 | Aulerich et al. | ....... | 280/124.152 |
| 6,942,227 B2 * | 9/2005 | Heller et al. | ............. | 280/5.502 |
| 7,290,772 B2 * | 11/2007 | Taneda et al. | ............ | 280/5.508 |
| 7,311,316 B2 * | 12/2007 | Yasui et al. | ............... | 280/5.511 |
| 7,322,580 B2 * | 1/2008 | Suzuki et al. | ............ | 280/5.511 |
| 7,354,048 B2 * | 4/2008 | Suzuki et al. | ............ | 280/5.502 |
| 7,543,823 B2 * | 6/2009 | Buma et al. | .............. | 280/5.502 |
| 2005/0110228 A1 * | 5/2005 | Fujimori | .................. | 280/5.511 |
| 2005/0192728 A1 | 9/2005 | Yasui et al. | | |
| 2005/0206100 A1 * | 9/2005 | Ohta et al. | ............... | 280/5.511 |
| 2005/0264247 A1 | 12/2005 | Buma et al. | | |
| 2006/0192354 A1 * | 8/2006 | Van Cayzeele | ........... | 280/5.506 |

FOREIGN PATENT DOCUMENTS

CN 1796167 A 7/2006

(Continued)

*Primary Examiner*—Paul N Dickson
*Assistant Examiner*—Robert A Coker
(74) *Attorney, Agent, or Firm*—Oblon, Spivak, McClelland, Maier & Neustadt, L.L.P.

(57) ABSTRACT

A stabilizer system for a vehicle including: a stabilizer apparatus which includes: a stabilizer bar connected at opposite ends thereof to respective wheel holding members which respectively hold left and right wheels of the vehicle; and an actuator which changes rigidity of the stabilizer bar in accordance with an operational amount of the actuator from a neutral position; and a control device which determines a target operational amount of the actuator based on a roll-moment-index amount indicative of roll moment that acts on a body of the vehicle, wherein the control device determines the target operational amount such that the target operational amount is made different for different directions of the roll moment that acts on the body of the vehicle and controls an operation of the actuator based on the determined target operational amount.

8 Claims, 8 Drawing Sheets

FOREIGN PATENT DOCUMENTS

| | | |
|---|---|---|
| EP | 1 568 521 | 8/2005 |
| EP | 1 600 313 | 11/2005 |
| JP | 59-99809 | 7/1984 |
| JP | 2002 518245 | 6/2002 |
| JP | 2005-88722 | 4/2005 |
| JP | 2005-238971 | 9/2005 |
| JP | 2006-188080 | 7/2006 |
| JP | 2007-30575 | 2/2007 |

* cited by examiner

VEHICLE STABILIZER SYSTEM

TECHNICAL FIELD

The present invention relates in general to a stabilizer system installed on a vehicle, and more particularly to such a stabilizer system which is equipped with an actuator and which is capable of changing rigidity or stiffness of a stabilizer bar by an operation of the actuator.

BACKGROUND ART

In recent years, there is proposed an active stabilizer system as described in JP-A-2002-518245, namely, a stabilizer system capable of changing roll restraining force to be exerted or generated by a stabilizer bar in accordance with turning conditions of a vehicle, etc. Such active stabilizer system is installed actually on some vehicles. The stabilizer system includes a stabilizer apparatus constituted by including a stabilizer bar and an actuator. By controlling the operation of the actuator, the rigidity of the stabilizer bar is changed, thereby actively changing the roll restraining force to be exerted by the stabilizer bar.

DISCLOSURE OF THE INVENTION

(A) Summary of the Invention

In the above-indicated stabilizer system, a roll amount of the vehicle body may differ depending on turning conditions of the vehicle, i.e., depending on whether the vehicle turns to right or left, even where the actuator is similarly controlled in the right turning and the left turning of the vehicle. The difference in the roll amount arises from a structure of the stabilizer apparatus such as a configuration of the stabilizer bar and a location of the actuator. Further, in some cases, it would be advantageous that the roll restraining force upon the right turning and the roll restraining force upon the left turning are made different from each other, depending on a vehicle structure and a vehicle condition, and the like. Accordingly, if the stabilizer system is configured to be able to deal with such phenomena and situations, the utility of the stabilizer system will be improved. The present invention was developed in the light of the above. It is therefore an object of the invention to provide a vehicle stabilizer system with high utility.

To achieve the object indicated above, a stabilizer system for a vehicle according to the present invention is arranged such that the rigidity of the stabilizer bar can be changed by controlling an operational amount of the actuator and such that the actuator is controllable in a manner in which a target operational amount of the actuator is made different for different directions of roll moment that acts on the vehicle body.

In the stabilizer system according to the present invention, even when there is a difference between the roll amount of the vehicle body when the vehicle turns right and the roll amount of the vehicle body when the vehicle turns left, the difference can be reduced. According to such advantages, the present stabilizer system has high utility.

(B) Forms of the Invention

There will be described in detail various forms of an invention which is considered claimable (hereinafter may be referred to as "claimable invention"). Each of the forms of the invention is numbered like the appended claims and depends from the other form or forms, where appropriate, for easier understanding of the invention. It is to be understood that the invention is not limited to the technical features or any combinations thereof which will be described, and shall be construed in the light of the following descriptions of the various forms and preferred embodiments of the claimable invention. It is to be further understood that a plurality of elements or features included in any one of the following forms of the claimable invention are not necessarily provided all together, and that any form in which one or more elements or one or more features is/are added to any one of the following forms and any form in which one or more elements or one or more features is/are deleted from any one of the following forms may be considered one form of the claimable invention.

(1) A stabilizer system for a vehicle comprising:

a stabilizer apparatus which includes: a stabilizer bar connected at opposite ends thereof to respective wheel holding members which respectively hold left and right wheels of the vehicle; and an actuator which changes rigidity of the stabilizer bar in accordance with an operational amount of the actuator from a neutral position; and a control device which determines a target operational amount of the actuator based on a roll-moment-index amount indicative of roll moment that acts on a body of the vehicle, wherein the control device determines the target operational amount such that the target operational amount is made different for different directions of the roll moment that acts on the body of the vehicle and controls an operation of the actuator based on the determined target operational amount.

The stabilizer system constructed according to the present form (1) is a so-called "active stabilizer system" which permits the stabilizer bar to exert roll restraining force with respect to the roll moment that acts on the vehicle body and which is configured such that the roll restraining force is controllable in accordance with the roll moment. The stabilizer bar is arranged to exert the roll restraining force in accordance with its rigidity. In the present stabilizer system, the rigidity of the stabilizer bar is changed by controlling the operational amount of the actuator, whereby the roll restraining force is adjusted for making a roll amount of the vehicle body appropriate.

In the present stabilizer system, the target operational amount of the actuator is made different for different directions of the roll moment that acts on the vehicle body, so that the rigidity of the stabilizer bar can be made appropriate for the different directions of the roll moment. That is, when the control is executed under a certain operational amount of the actuator, the rigidity of the stabilizer bar may differ depending on a direction in which the roll restraining force is to be exerted, resulting from the structure of the stabilizer apparatus, for instance. In this instance, according to the present form, it is possible to obtain a similar roll restraining effect with respect to the roll moment in both of the different directions. In other words, even where the roll amount of the vehicle body for the same magnitude of the roll moment differs depending on whether the vehicle turns right or left, such a difference in the roll amount can be reduced. Further, where the rigidity of the stabilizer bar is the same for a certain operational amount of the actuator irrespective of the direction of the roll restraining force, it would be advantageous that the roll restraining force to be exerted by the stabilizer bar is made different for different directions thereof, depending on the vehicle structure, the vehicle condition, and the like. The present system is also advantageous in such an instance.

The "stabilizer bar" in the present system is not particularly limited in its shape, structure, etc. For instance, the stabilizer bar may be structured to generate the roll restraining moment by being twisted. More specifically described, it is possible to employ a stabilizer bar having a structure similar to that of a stabilizer bar of an ordinary stabilizer system without having the actuator (hereinafter may be referred to as "a conventional stabilizer system" or "a conventional system"). Further, as explained below, it is possible to employ a structure in which the stabilizer bar of the conventional system is divided into a pair of stabilizer bar members and the divided two stabilizer bar members constitute one stabilizer bar.

The "actuator" of the present system may be configured to change the rigidity of the stabilizer bar by displacing or deforming the stabilizer bar or by exerting certain force on the stabilizer bar. The term "rigidity of the stabilizer bar" used herein does not mean rigidity as a physical value of the stabilizer bar per se, but means so-called apparent or seeming rigidity. More specifically, the rigidity of the stabilizer bar means a relationship between (a) relative displacement amount of the opposite ends of the stabilizer bar respectively connected to left and right wheel-holding members such as suspension arms and (b) roll restraining force to be exerted. Accordingly, the rigidity of the stabilizer bar is changed for thereby changing the above-indicated relative displacement amount for certain roll restraining force, whereby the roll amount of the vehicle body can be changed. In this respect, the "neutral position" as a reference of the operational amount of the actuator may be the operational position of the actuator when the vehicle is at a stop on a flat rod surface, namely, the operational position of the actuator when the vehicle is free from the roll moment.

The structure of the actuator is not specifically limited. There may be employed actuators with various structures such as a cylinder-device-like actuator which is operated by a fluid pressure such as an oil pressure and a motor-operated actuator which is operated by drive force of an electric motor. Further, the operation of the actuator may be linear or rotary.

The "control device" of the present system may be constituted by including a controller that is principally constituted by a computer, for example. Further, where the actuator includes an electric motor as a drive source, the control device may be constituted by including a driver such as an inverter.

In the control of the actuator by the control device, the target operational amount of the actuator is determined based on the roll-moment-index amount indicated above. The term "roll-moment-index amount" used herein is a physical amount which directly or indirectly indicates the roll moment that acts on the vehicle body. The roll-moment-index amount may be considered as a parameter that indicates the turning condition of the vehicle. Various sorts of physical amounts are employed as the roll-moment-index amount such as lateral acceleration, a yaw rate, cornering force, lateral force, and a slip angle. Since a steering angle, a vehicle running speed, etc., are factors which determine the turning condition of the vehicle, those parameters may be considered also as the roll-moment-index amount. As the control of the actuator executed based on the target operational amount, it is possible to employ those according to various sorts of control techniques such as a feed-back control based on deviation of an actual operational amount of the actuator from the target operational amount. It is noted that the control device may be constituted, in its functional aspect, by including a target-operational-amount determining portion for determining the target operational amount and an actuator-operation controlling portion for controlling the operation of the actuator on the basis of the target operational amount determined by the target-operational-amount determining portion.

The operational amount of the actuator is often in a correspondence relationship with the force exerted by the actuator, i.e., actuator force. (Where the actuator includes the electric motor as the drive source, the operational amount of the actuator may be in a correspondence relationship with force of the electric motor.) For the stabilizer system having such a correspondence relationship, the present form may be arranged to execute a control in which the actuator force coincides with target actuator force while setting the actuator force as a control target, instead of setting the operational amount of the actuator as a direct control target. In other words, the present form includes a form in which the operational amount of the actuator is set as an indirect control target.

(2) The stabilizer system according to the above form (1), wherein the control device is configured to determine the target operational amount according to a relationship between roll-moment-index amount and target operational amount, the relationship being set such that a ratio of an increase in the target operational amount to an increase in the roll-moment-index amount is made different for the different directions of the roll moment that acts on the body of the vehicle.

The present form is limited in terms of the technique of determining the target operational amount of the actuator. The stabilizer apparatus constructed as described above is generally designed such that the rigidity of the stabilizer bar increases with an increase in the operational amount of the actuator. Further, with an increase in the roll moment that acts on the vehicle body, the operational amount of the actuator is increased for effectively restraining the rolling of the vehicle body by increasing the roll restraining force with respect to the roll moment. Therefore, the actuator is controlled such that the target operational amount is changed in accordance with the roll-moment-index amount. The present form is arranged such that, in the control described above, a ratio of an increase in the target operational amount with respect to an increase in the roll-moment-index amount, e.g., an increase gradient, is made different depending upon the direction in which the roll restraining force is exerted. More specifically explained, the present form may be practiced as follows. There are set two sorts of map data for determining the target operational amount in which the roll-moment-index amount is used as a parameter. A suitable one of the two sorts of map data is selected depending upon the direction of the roll moment, and the target operational amount is determined based on the selected map data.

(3) The stabilizer system according to the above form (1) or (2), wherein the control device is configured to determine the target operational amount such that a gain used in determining the target operational amount based on the roll-moment-index amount is made different for the different directions of the roll moment that acts on the body of the vehicle.

The present form is limited in terms of the technique of determining the target operational amount of the actuator. For instance, the present form may be practiced as follows. A reference target operational amount is initially obtained according to one process based on the roll-moment-index amount and then the reference target operational amount is multiplied by a certain coefficient, thereby determining the target operational amount. The coefficient is arranged to be changed depending upon the direction of the roll moment.

(4) The stabilizer system according to any one of the above forms (1)-(3), wherein the control device is configured to determine the target operational amount such that the target operational amount is made different for the different directions of the roll moment that acts on the body of the vehicle, for reducing a difference between the rigidity of the stabilizer bar to be exhibited with respect to the roll moment in one of the different directions and the rigidity of the stabilizer bar to be exhibited with respect to the roll moment in the other of the different directions, the difference arising from a structure of the stabilizer apparatus.

In the present form, the purpose of making the target operational amount different for the different directions of the roll moment is clarified. When the actuator is controlled under a certain operational amount, the rigidity of the stabilizer bar may differ depending on the direction in which the roll restraining force is exerted. In this instance, the roll amount of the vehicle body differs depending on whether the vehicle is turning left or right, for instance, even if the actuator is controlled under the same operational amount. According to the present form, the operational amount of the actuator is made different for different directions of the roll moment in view of the influence of the difference in the rigidity of the stabilizer bar, thereby eliminating or reducing a difference in the roll amount of the vehicle body, which difference results from the different directions of the roll moment. The "structure of the stabilizer apparatus" in this form includes various concepts such as shapes, materials, types, and specifications of the stabilizer bar and the actuator of the stabilizer apparatus, a positional relationship and a connecting structure between the stabilizer bar and the actuator, an installation structure and position of the stabilizer apparatus onto the vehicle body or the wheel-holding members.

(5) The stabilizer system according to any one of the above forms (1)-(4), wherein the stabilizer bar is constituted by including a pair of stabilizer bar members each of which includes a torsion bar portion disposed on an axis extending in a width direction of the vehicle and an arm portion which extends continuously from the torsion bar portion so as to intersect the torsion bar portion and which is connected at a leading end thereof to a corresponding one of the wheel holding members, and wherein the actuator is configured to rotate the torsion bar portions of the pair of stabilizer bar members relative to each other about the axis and to change the rigidity of the stabilizer bar in accordance with a relative rotational amount of the torsion bar portions of the pair of stabilizer bar members, as the operational amount.

The stabilizer system according to this form may be considered as follows. For instance, the stabilizer system has a stabilizer bar having two stabilizer bar members which are rotatably connected relative to each other and which correspond to two parts of a stabilizer bar of the conventional stabilizer system without the actuator, the two parts being obtained by dividing a portion of the conventional stabilizer bar at an intermediate portion thereof. In this form, where the divided two parts are regarded as one integral stabilizer bar, the apparent rigidity of the integral stabilizer bar is changed by rotating the divided two parts relative to each other. According to this form, the roll restraining force to be exerted by the stabilizer bar is effectively changeable. That is, the present form permits easy execution of the control to actively change the rigidity of the stabilizer bar in accordance with the roll moment that acts on the vehicle body.

(6) The stabilizer system according to the above form (5), wherein the actuator is disposed off-centered in the width direction of the vehicle and the torsion bar portions of the pair of stabilizer bar members have mutually different length values.

In general, the stabilizer apparatus constructed as described above is supported so as to be rotatable, by the vehicle body at opposite ends of a part of the stabilizer bar functioning as a torsion bar, namely, at end portions of the respective torsion bar portions of the pair of stabilizer bar members, which end portions are located near to the corresponding arm portions. The roll restraining force exerted by the stabilizer bar mainly depends on twisting of the above-indicated part of the stabilizer bar functioning as the torsion bar. (Hereinafter, this part may be referred to as "a torsion bar portion" in one stabilizer bar constituted by the pair of stabilizer bar members.) The rigidity of the stabilizer bar depends on twisting rigidity of the torsion bar portion. However, where the left-side and right-side connecting portions of the stabilizer bar with the respective wheel-holding members are displaced in mutually opposite directions, the torsion bar portion undergoes deflection (bending). The rigidity with respect to such deflection is one component of the rigidity of the stabilizer bar.

In the stabilizer apparatus according to this form, the actuator is disposed at a location in the torsion bar portion of the stabilizer bar, which location is off-centered in the vehicle width direction. Therefore, there is expected a case in which the deflection of the torsion bar portion differs depending upon the direction of the above-indicated relative displacement of the left-side and right-side connecting portions, namely, depending upon the direction in which the roll restraining force is to be exerted. The difference in the deflection that relies upon the direction of the roll restraining force results in the difference in the rigidity of the stabilizer bar explained above. According to this form, the difference in the rigidity of the stabilizer bar which may arise form such a phenomenon is taken into account, whereby it is possible to eliminate or reduce the difference in the roll amount of the vehicle body that relies on the different directions of the roll moment, which difference is generated due to the difference in the rigidity of the stabilizer bar.

(7) The stabilizer system according to the above form (5) or (6), wherein at least one of the torsion bar portions of the pair of stabilizer bar members has a bent portion that is shifted from the axis extending in the width direction of the vehicle and the torsion bar portions have mutually different shapes.

As explained above, the rigidity of the stabilizer bar depends on the deflection of the torsion bar portion of the stabilizer bar. In the stabilizer apparatus according to this form, the torsion bar portion has the bent portion. Accordingly, the two torsion bar portions of the pair of stabilizer bar members between which the actuator is interposed have mutually different shapes. Thus, the deflection of the torsion bar portion of the stabilizer bar differs depending upon the direction in which the roll restraining force is to be exerted. In this instance, there may be expected a case in which the above-indicated difference in the rigidity of the stabilizer bar is generated. In the present form, the difference in the rigidity of the stabilizer bar which arises from such a phenomenon is taken into account, whereby it is possible to eliminate or reduce the difference in the roll amount of the vehicle body that results from the different directions of the roll moment, which difference is generated due to the difference in the rigidity of the stabilizer bar.

In an arrangement in which the above-indicated form (6) and this form (7) are combined, i.e., in an arrangement in which the actuator is disposed off-centered and the two torsion bar portions between which the actuator is interposed have the mutually different shapes, there may be a possibility that a larger difference in the rigidity of the stabilizer bar is generated. Therefore, the present form more effectively eliminates or restrains the difference in the roll amount of the vehicle body that results from the different directions of the roll moment, which difference is generated due to the difference in the rigidity of the stabilizer bar.

(8) The stabilizer system according to any one of the above forms (5)-(7), wherein the actuator includes a housing, an electric motor supported by the housing, and a decelerator which is supported by the housing and which is for decelerating rotation of the electric motor, and wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

In this form, the actuator of the stabilizer system constructed as described above is motor-operated. In other words, the structure of the actuator of a motor-operated active stabilizer system is specifically limited. In this form, the rigidity of the stabilizer bar can be easily changed by controlling the electric power to be supplied to the electric motor. According to the present form, the stabilizer system with good controllability is realized.

BRIEF DESCRIPTION OF THE DRAWINGS

The above and other objects, features, advantages and technical and industrial significance of a claimable invention will be better understood by reading a following detailed description of a preferred embodiment of the invention, when considered in connection with the accompanying drawings, in which:

FIG. 2 is a schematic view showing a stabilizer apparatus of the stabilizer system of FIG. 1, in which

FIG. 4 is a view schematically showing deflection of a stabilizer bar of the front-wheel-side stabilizer apparatus due to roll moment, in which

DETAILED DESCRIPTION OF THE PREFERRED EMBODIMENT

Figure 1:
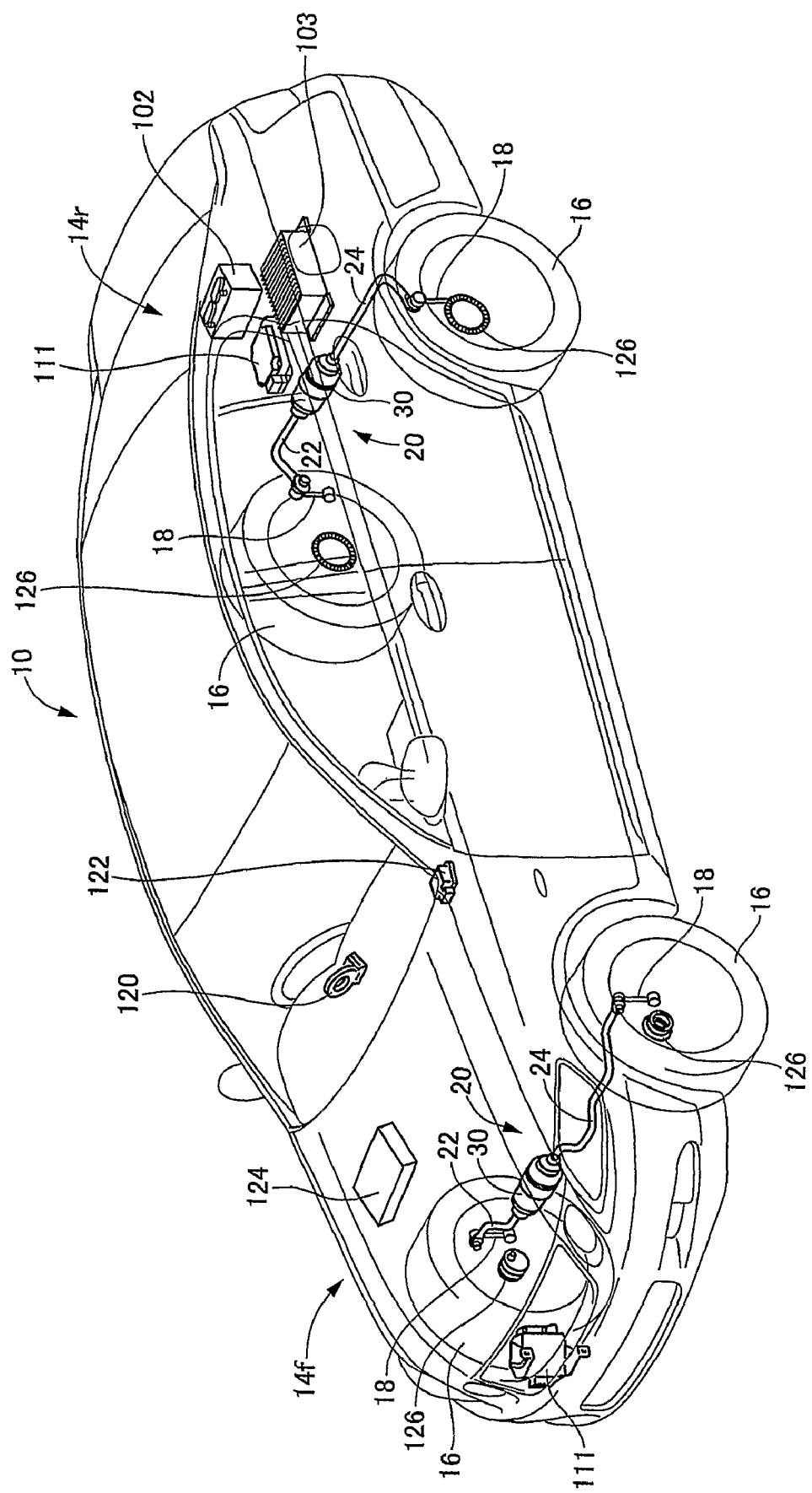
FIG. 1 is a perspective view showing an overall structure of a stabilizer system for a vehicle according to one embodiment of a claimable invention.

There will be described in detail one embodiment of the claimable invention, referring to the drawings. It is to be understood, however, that the invention is not limited to the following embodiment, but may be embodied with various changes and modifications, such as those described in the FORMS OF THE INVENTION, which may occur to those skilled in the art.

1. Overall Structure of Stabilizer System

FIG. 1 schematically shows a stabilizer system 10 for a vehicle according to one embodiment of the claimable invention. The stabilizer system 10 includes two stabilizer apparatus 14 one of which is disposed on a front-wheel side of the vehicle and the other of which is disposed on a rear-wheel side of the vehicle. Each stabilizer apparatus 14 includes a stabilizer bar 20 connected at opposite ends thereof, via respective link rods 18 each as a connecting member, to respective wheel-holding members (FIG. 2) which respectively hold front and rear wheels 16. The stabilizer bar 20 is divided into two parts, i.e., a pair of stabilizer bar members consisting of a right stabilizer bar member 22 and a left stabilizer bar member 24. The pair of stabilizer bar members 22, 24 are connected rotatably relative to each other with an actuator 30 interposed therebetween. Roughly speaking, the stabilizer apparatus 14 is arranged such that the actuator 30 rotates the right and left stabilizer bar members 22, 24 relative to each other, thereby changing apparent rigidity of the stabilizer bar 20 as a whole, for restraining rolling of the vehicle body. In the present stabilizer system 10, the front-wheel-side stabilizer apparatus 14 and the rear-wheel-side stabilizer apparatus 14 partly differ from each other in construction. Accordingly, in the following description, where it is necessary to distinguish the two stabilizer apparatus 14, 14 from each other, a symbol "f" is attached to each of the reference numerals assigned to the front-wheel-side stabilizer apparatus 14 and its components while a symbol "r" is attached to each of the reference numerals assigned to the rear-wheel-side stabilizer apparatus 14 and its components. In addition, where it is also necessary to distinguish the components in the two apparatus 14, 14 with respect to the left-wheel side and the right-wheel side, there are attached, to suitable reference numerals, the following symbols: "fr" (front-right-wheel side), "fl" (front-left-wheel side), "rr" (rear-right-wheel side), and "rl" (rear-left-wheel side).

Figure 2A:
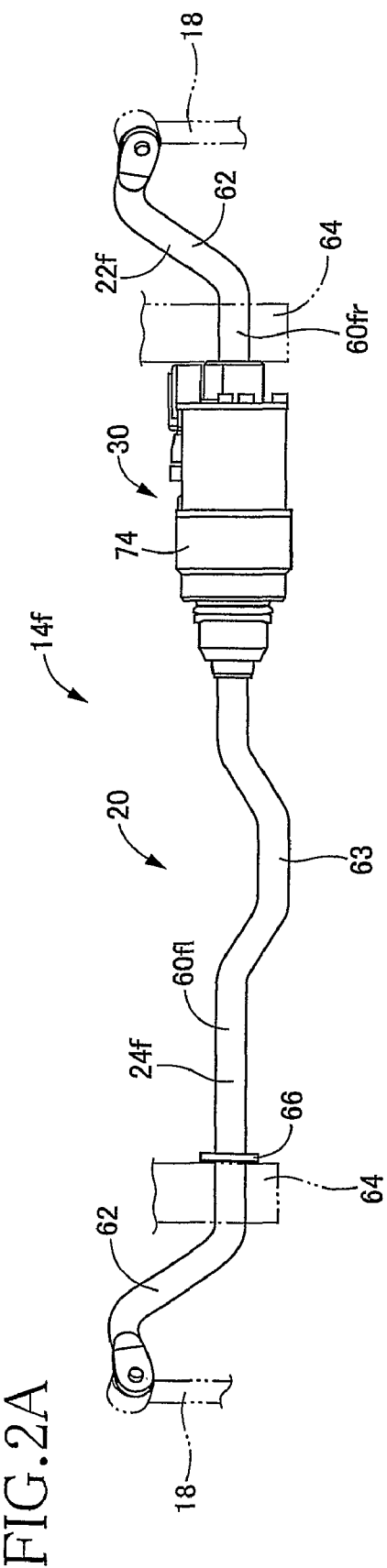
FIG. 2A shows a front-wheel-side stabilizer apparatus and FIG. 2B shows a rear-wheel-side stabilizer apparatus.
Figure 2B:
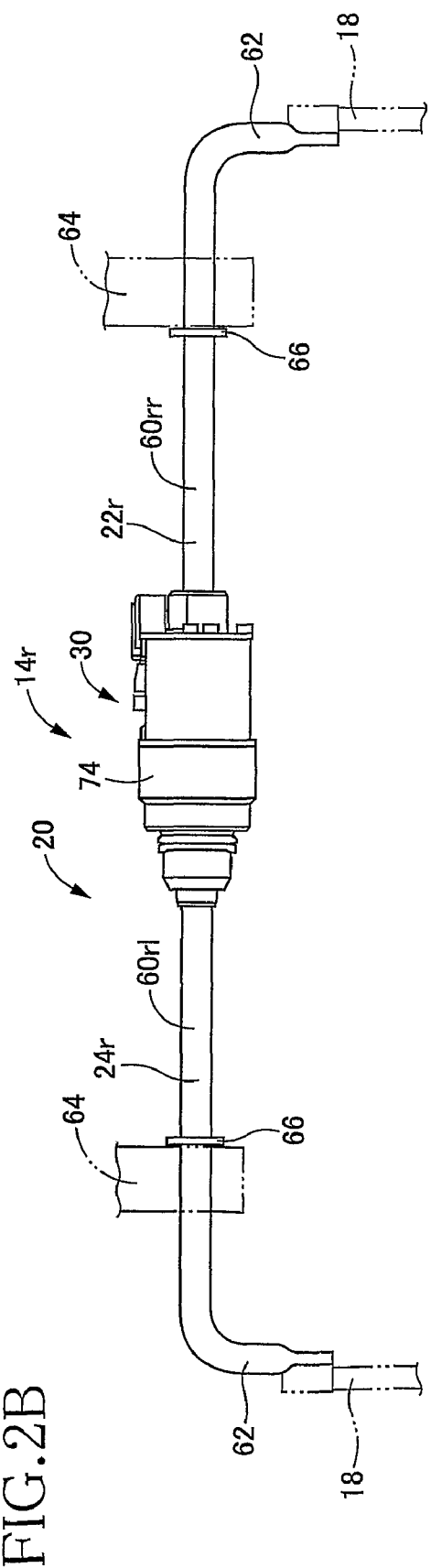

As shown in FIG. 2A, the stabilizer bar members 22f, 24f of the front-wheel-side stabilizer apparatus 14f respectively include: torsion bar portions 60fr, 60fl extending generally in a vehicle width direction: and arm portions 62, 62 formed integrally with the corresponding torsion bar portions 60fr, 60fl and intersecting the same 60fr, 60fl so as to extend generally in a rearward direction of the vehicle. The torsion bar portion 60fr of the right stabilizer bar member 22f is made comparatively short whereas the torsion bar portion 60fl of the left stabilizer bar member 24f is made comparatively long. The left stabilizer bar member 24f further includes a shifted or bent portion 63 which is shifted from an axis of the torsion bar portion 60fl. In the meantime, as shown in FIG. 2B, the stabilizer bar members 22r, 24r of the rear-wheel-side stabilizer apparatus 14r respectively include: torsion bar portions 60rr, 60rl extending generally in the vehicle width direction with generally the same length; and arm portions 62, 62 formed integrally with the corresponding torsion bar portions 60rr, 60rl and intersecting the same 60rr, 60rl so as to extend generally in a frontward direction of the vehicle. Unlike the torsion bar portions 60fr, 60fl of the front-wheel-side stabilizer apparatus 14f, each of the torsion bar portions 60rr, 60rl of the rear-wheel-side stabilizer apparatus 14r has a linear shape. Further, the length of the torsion bar portion 60rr extending between the actuator 30 and the corresponding arm portion 62 and the length of the torsion bar portion 60rl extending between the actuator 30 and the corresponding arm portion 62 are made substantially equal to each other.

The torsion bar portion 60 of each stabilizer bar member 22f, 22r, 24f, 24r is rotatably supported, at a position thereof near to the arm portion 62, by a supporting portion 64 that is fixedly provided on the vehicle body. Thus, the torsion bar portions 60 of the respective right and left stabilizer bar members 22, 24 are disposed coaxially relative to each other. In each of the front-wheel-side stabilizer apparatus 14f and the rear-wheel-side stabilizer apparatus 14r, the above-indicated actuator 30 is disposed to connect the left and right torsion bar portions 60 to each other. As explained below in detail, one end of each torsion bar portion 60 opposite to the arm portion 62 is connected to the actuator 30. In the front-wheel-side stabilizer apparatus 14f constructed as described above, the actuator 30 is disposed off-centered in the vehicle width direction, in other words, the actuator 30 is disposed at a position shifted rightward from a widthwise middle portion of the vehicle. In the rear-wheel-side stabilizer apparatus 14r constructed as described above, the actuator 30 is disposed at substantially the widthwise middle portion of the vehicle. In the meantime, one end of each arm portion 62 remote from the corresponding torsion bar portion 60 is connected to the corresponding wheel-holding member via the link rod 18. In the front-wheel-side stabilizer apparatus 14f, a restricting member 66 fixedly provided on the torsion bar portion 60fl and the actuator 30 are respectively held in close contact with mutually opposing surfaces of the two supporting portions 64, 64, thereby preventing the front-wheel-side stabilizer apparatus 14f from moving in the vehicle width direction. In the rear-wheel-side stabilizer apparatus 14r, two restricting members 66, 66 fixedly provided on the respective torsion bar portions 60rr, 60rl are respectively held in close contact with mutually opposing surfaces of the two supporting portions 64, 64, thereby preventing the rear-wheel-side stabilizer apparatus 14r from moving in the vehicle width direction.

Figure 3:
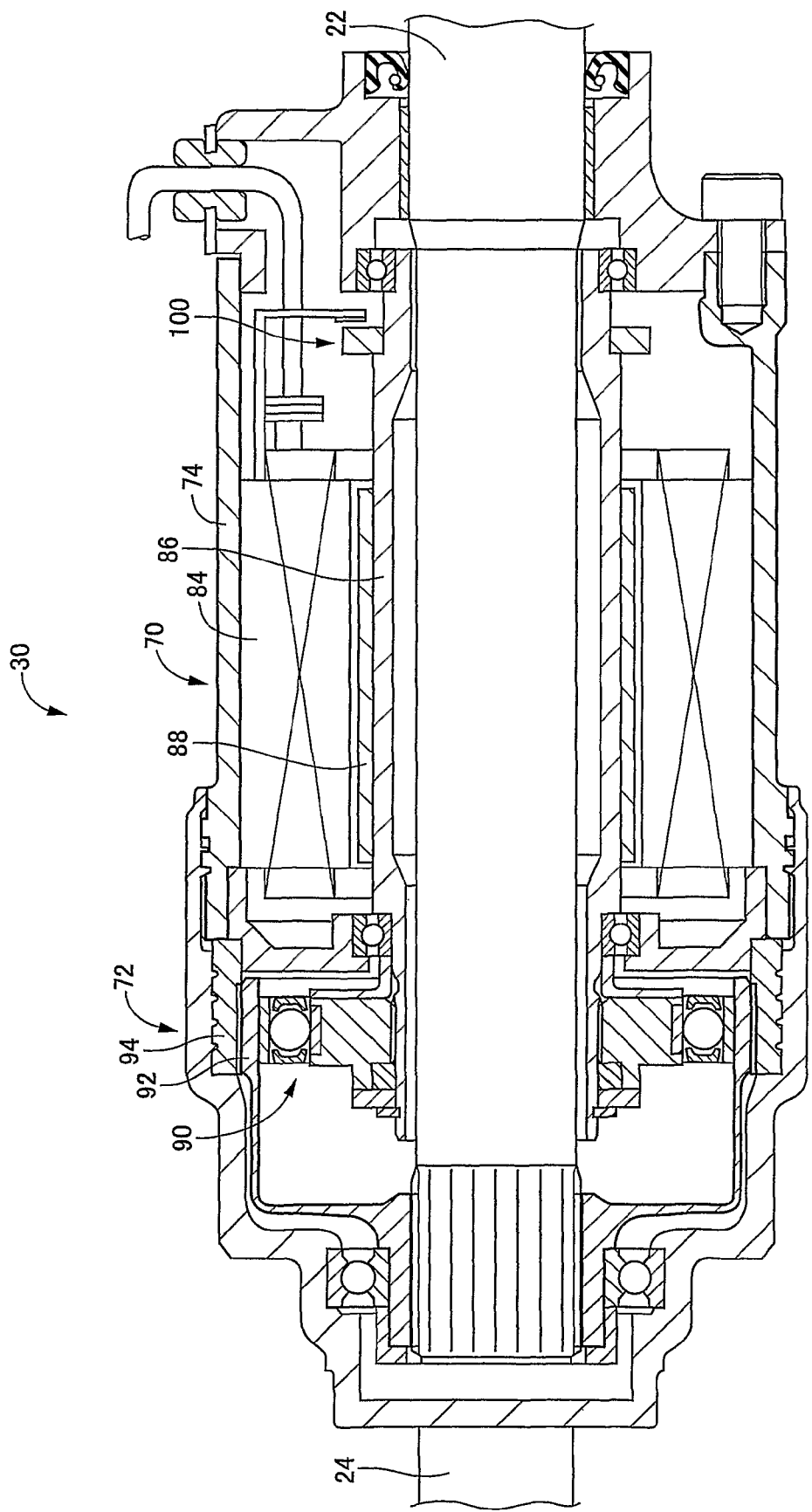
FIG. 3 is a schematic view in cross section showing an actuator of the stabilizer apparatus of FIG. 2.

The actuator 30 in the front-wheel-side stabilizer apparatus 14f and the actuator 30 in the rear-wheel-side stabilizer apparatus 14r are identical with each other in construction. As schematically shown in FIG. 3, the actuator 30 includes an electric motor 70 and a decelerator 72 for decelerating rotation of the electric motor 70. The electric motor 70 and the decelerator 72 are disposed inside of a housing 74 as an outer frame member of the actuator 30. As apparent from FIG. 3, the left stabilizer bar member 24 is fixedly connected to one end of the housing 74 while the right stabilizer bar member 22 is disposed to extend into the housing 74 and supported by the housing 74 so as to be roratable and axially immovable relative to the same 74. One end of the right stabilizer bar member 22 located within the housing 74 is connected to the decelerator 72.

The electric motor 70 includes: a plurality of stator coils 84 fixedly disposed on one circumference along an inner circumferential surface of the cylindrical wall of the housing 74; a hollow motor shaft 86 rotatably held by the housing 74; and permanent magnets 88 fixedly disposed on one circumference along an outer circumferential surface of the motor shaft 86 so as to face the stator coils 84. The electric motor 70 is a motor in which the stator coils 84 function as a stator and the permanent magnets 88 function as a rotor, and is a three-phase DC brushless motor.

In the present embodiment, the decelerator 72 is constituted as a harmonic gear mechanism including a wave generator 90, a flexible gear 92, and a ring gear 94. The harmonic gear mechanism is called "HARMONIC DRIVE" (trademark) or a strain wave gear ring mechanism. The wave generator 90 includes an oval cam and ball bearings fitted on a periphery of the cam, and is fixed to one end of the motor shaft 86. The flexible gear 92 is a cup-like member whose cylindrical wall portion is elastically deformable. A plurality of teeth are formed on an outer circumference of the open end portion of the cup-like flexible gear 92. The flexible gear 92 is connected to the right stabilizer bar member 22 described above and held by the same 22. In detail, the right stabilizer bar member 22 penetrates the motor shaft 86 and has an end portion extending from or beyond the motor shaft 86. To this end portion of the right stabilizer bar member 22, a bottom portion of the flexible gear 92 as an output portion of the decelerator 72 is fixed by serration engagement with the end portion penetrating the bottom portion, whereby the flexible gear 92 and the right stabilizer bar member 22 are connected to each other so as to be unrotatable and axially immovable relative to each other. The ring gear 94 is a generally ring-like member and is fixed to the housing 74. A plurality of teeth are formed on an inner circumference of the ring gear 94. The number of teeth formed on the inner circumference of the ring gear 94 is slightly larger (e.g., larger by two) than the number of teeth formed on the outer circumference of the flexible gear 92. The flexible gear 92 is fitted at its cylindrical wall portion on the wave generator 90, and is elastically deformed into an oval shape. The flexible gear 92 meshes the ring gear 94 at two portions thereof corresponding to opposite ends of the long axis of the oval and does not mesh the same 94 at the other portion thereof. With one rotation of the wave generator 90 (i.e., after rotation of the wave generator 90 by 360°), in other words, after one rotation of the motor shaft 86 of the electric motor 70, the flexible gear 92 and the ring gear 94 are rotated relative to each other by an amount corresponding to the difference in the number of teeth therebetween.

In the thus constructed stabilizer apparatus 14, where the vehicle body undergoes, due to turning of the vehicle or the like, force which changes a distance between one of the right and left wheels 16 and the vehicle body and a distance between the other of the right and left wheels 16 and the vehicle body, relative to each other, i.e., roll moment, the actuator 30 receives force acting thereon which rotates the left stabilizer bar member 22 and the right stabilizer bar member 24 relative to each other, i.e., external input force. In this instance, when the actuator 30 exerts, as actuator force, force which is in balance with the external input force, owing to motor force that is generated by the electric motor 70, one stabilizer bar 20 constituted by the right and left stabilizer bar members 22, 24 is twisted. (The above-indicated motor force may be hereinafter referred to as "rotational torque" because the electric motor 70 is a rotation motor and therefore the force generated by the electric motor 70 is considered as rotational torque.) Elastic force generated by the twisting of the stabilizer bar 20 functions as counter force with respect to the roll moment, i.e., roll restraining force. By changing, owing to the motor force, a rotational position (an operational position) of the actuator 30, a relative rotational position of the right and left stabilizer bar members 22, 24 is changed, whereby the above-indicated roll restraining force is changed. Consequently, the roll amount of the vehicle body can be changed. The present stabilizer apparatus 14 is arranged such that the apparent rigidity of the stabilizer bar 20, i.e., the stabilizer rigidity, is changeable.

The actuator 30 has, in the housing 74 thereof, a motor-rotational-angle sensor 100 for detecting a rotational angle of the motor shaft 86, i.e., a rotational angle of the electric motor 70. The motor-rotational-angle sensor 100 of the present actuator 30 is constituted principally by an encoder. A value detected by the sensor 100 is utilized in the control of the actuator 30, that is, in the control of the stabilizer apparatus 14, as an index indicating a relative rotational angle (the relative rotational position) of the right and left stabilizer bar members 22, 24, in other words, as an index indicating the operational amount, i.e., the rotational amount, of the actuator 30.

To the electric motor 70 of the actuator 30, there is supplied electric power from a battery 102 as shown in FIG. 1. The present stabilizer system 10 is provided with a DC-DC converter 103 for raising the voltage to be supplied from the battery 102. An electric power source is constituted by including the battery 102 and the converter 103. In the present stabilizer system 10, a stabilizer electronic control unit 111 (hereinafter may be simply referred to as "the stabilizer ECU") is provided between the converter 103 and each of the two stabilizer apparatus 14. Each stabilizer ECU 111 is constituted by including: an inverter, not shown, as a driver; and a controller, not shown, as a control device. The electric power is supplied to the electric motors 70 of the respective two stabilizer apparatus 14 via the respective two inverters 104 of the two stabilizer ECU 111. Because each electric motor 70 is driven at a constant voltage, the amount of electric power to be supplied is changed by changing the amount of electric current to be supplied, and each electric motor 70 exerts or generates force in accordance with the amount of electric current supplied thereto. In this respect, the amount of electric current to be supplied is changed such that a ratio (duty ratio) of a pulse-on time to a pulse-off time by PWM (Pulse Width Modulation) is changed by the inverter 104.

As shown in FIG. 1, the controller of each stabilizer ECU 111 is constituted principally by a computer including a CPU, a ROM, a RAM, etc. To the controller of each stabilizer ECU 111, there are connected, in addition to the aforementioned motor-rotational-angle sensor 100, a steering sensor 120 for detecting an operation angle of a steering wheel which is an operation amount of a steering operating member as a steering amount and a lateral-acceleration sensor 122 for detecting actual lateral acceleration which is lateral acceleration actually generated in the vehicle. To the controllers of the respective stabilizer ECUs 111, there is farther connected a brake electronic control unit 124 (hereinafter may be simply referred to as "the brake ECU") as a control device for controlling the braking system of the vehicle. To the brake ECU 124, there are connected four vehicle-speed sensors 126 which are provided for the respective four wheels to detect respective rotation speeds thereof. The brake ECU 124 is configured to perform braking control by calculating the vehicle running speed based on values detected by the respective four vehicle-speed sensors 126. The controller of each stabilizer ECU 111 is connected to the brake ECU 124 and configured to obtain, as needed, the vehicle speed calculated by the same 124.

The controller of each stabilizer ECU 111 is connected to the inverter provided within the same 111. The controller controls the actuator force generated by the actuator 30 by controlling the inverter and also controls the rotational position of the actuator 30, namely, the relative rotational position of the right and left stabilizer bar members 22, 24.

As explained above, the present stabilizer system 10 has the two stabilizer apparatus 14, i.e., the front-wheel-side stabilizer apparatus 14f and the rear-wheel-side stabilizer apparatus 14r. The two stabilizer apparatus 14f, 14r are controlled independently of each other in accordance with predetermined roll stiffness distribution and respectively generate predetermined roll restraining force.

2. Control of Stabilizer Apparatus i) Basic Control

In the stabilizer apparatus 14, a target rotational position of the actuator 30 is determined based on a roll-moment-index amount indicative of the roll moment the vehicle receives, and the rotational position of the actuator 30 is controlled so as to coincide with the target rotational position. The term "rotational position of the actuator 30" used herein means an operational amount of the actuator 30. In detail, the rotational position of the actuator 30 means the following: A state in which no roll moment acts on the vehicle body is deemed to be a normal state. Where the rotational position of the actuator 30 in the normal state is deemed to be a neutral position, the rotational position of the actuator 30 indicates an amount of rotation from the neutral position. In other words, the rotational position of the actuator 30 means a displacement amount of the operational position of the actuator 30 from the neutral position. Because there is a correspondence relationship between the rotational position of the actuator 30 and a motor rotational angle which is a rotational angle of the electric motor 70, the motor rotational angle is used in the actual control of the actuator 30, in place of the rotational position of the actuator 30.

The control of the stabilizer apparatus 14 will be explained in more detail. In the controller, there is determined a target rotational position of the actuator 30, i.e., a target motor rotational angle $\theta^*$, is determined based on the lateral acceleration as the roll-moment-index amount, for obtaining appropriate stabilizer rigidity. More specifically explained, there is determined, according to the following formula, control-use lateral acceleration $Gy^*$ to be utilized in the control, on the basis of: estimated lateral acceleration $Gyc$ that is estimated based on the operation angle of the steering wheel and the vehicle running speed; and actual lateral acceleration $Gyr$ that is actually measured:

$$Gy^* = K_1 \cdot Gyc + K_2 \cdot Gyr$$

wherein $K_1$ and $K_2$ are gains. The target motor rotational angle $\theta^*$ is determined based on the thus determined control-use lateral acceleration $Gy^*$. According to a feed-back control method based on deviation of an actual motor rotational angle $\theta$ which is an actual rotational angle of the motor 70, from the target motor rotational angle $\theta^*$, a target supply current $i^*$ to be supplied to the motor 70 is determined, and a command relating to the determined target supply current $i^*$ is transmitted from the controller to the inverter. As a result, appropriate electric power is supplied to the electric motor 70 of the actuator 30 by the inverter in an attempt to make the rotational position of the actuator 30 close to the target rotational position or maintain the rotational position of the actuator 30 at the target rotational position.

In the present stabilizer system 10, the front-wheel-side stabilizer apparatus 14f and the rear-wheel-side stabilizer apparatus 14r differ from each other in construction as explained above, so that the stabilizer bars 20 of the respective two apparatus 14f, 14r have mutually different rigidity. Accordingly, in the control in the present stabilizer system 10, there is executed processing for determining an appropriate target motor rotational angle $\theta^*$ based on the control-use lateral acceleration $Gy^*$, that is, processing for determining the target operational amount of the actuator 30, which processing is made different for the front-wheel side and the rear-wheel side of the vehicle. Hereinafter, the control of the stabilizer bar 20 of the front-wheel-side stabilizer apparatus 14f and the control of the stabilizer bar 20 of the rear-wheelside stabilizer apparatus 14r will be explained referring to the rigidity of the stabilizer bars 20 of the respective two apparatus 14f, 14r.

ii) Control of Front-Wheel-Side Stabilizer Apparatus

As described above, in the front-wheel-side stabilizer apparatus 14f, the length and the shape of the torsion bar portion 60fr of the right stabilizer bar member 22f are made different from those of the torsion bar portion 60fl of the left stabilizer bar member 24f, and the actuator 30 is disposed off-centered, namely, located at a position that is shifted rightward from the vehicle widthwise middle portion. Such a structure is often found in vehicles in which various devices are mounted on the front side of the vehicle, such as front-wheel-drive (FF) vehicles. In the present stabilizer system 10, to avoid interference of the stabilizer bar 20f with various devices, the stabilizer bar 20f is configured such that the torsion bar portion 60fl of the left stabilizer bar member 24f is shaped to have the above-indicated shifted or bent portion 63 which is shifted from the axis of the torsion bar portion 60fl and such that the actuator 30 is disposed off-centered.

Figure 4A:
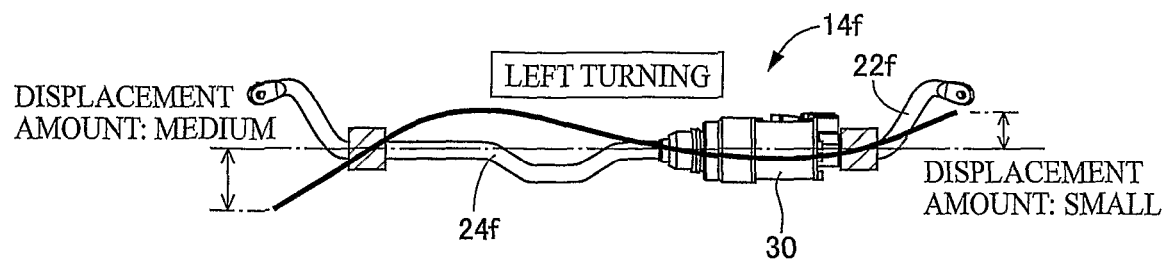
FIG. 4A shows deflection of the stabilizer bar in left turning of the vehicle and FIG. 4B shows deflection of the stabilizer bar in right turning of the vehicle.
Figure 4B:
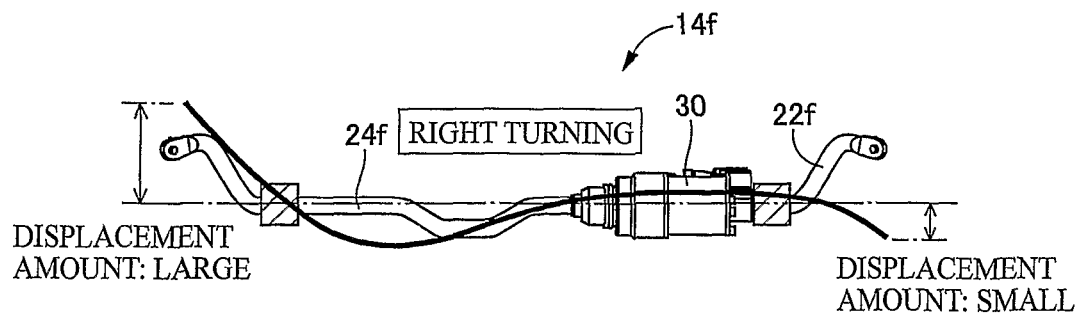

The stabilizer bar 20 is arranged to exert the roll restraining force in accordance with its rigidity that is mainly determined by rigidity that relies on twisting of the torsion bar portions 60. In addition, a rigidity component that relies on deflection of the torsion bar portions 60 also acts as one component that determines the rigidity of the stabilizer bar 20. That is, the rigidity of the stabilizer bar 20 also relies on deflection of the torsion bar portions 60. As explained above, in the front-wheel-side stabilizer apparatus 14f, the stabilizer bar 20f is arranged such that the two torsion bar portions 60fl, 60fr between which the actuator 30 is interposed have the mutually different configurations and such that the actuator 30 is off-centered. Therefore, the deflection of portions of the stabilizer bar 20f that function as torsion bar differs for different directions in which the roll restraining force is to be exerted. FIGS. 4A and 4B schematically indicate the deflection amount of the front-wheel-side stabilizer bar 20f upon the left turning of the vehicle and the right turning of the vehicle, respectively. Solid thick lines in FIGS. 4A and 4B show the deflection amount of the stabilizer bar 20f. Comparison between the deflection amount of the stabilizer bar 20f in various portions thereof upon the left turning of the vehicle shown in FIG. 4A and the deflection amount of the stabilizer bar 20f in various portions thereof upon the right turning of the vehicle shown in FIG. 4B reveals that the deflection amount of the stabilizer bar 20f is larger upon the right turning of the vehicle than that upon the left turning of the vehicle even where the vehicle turns at the same speed and by the same steering amount. In particular, the displacement amount of the left-side end portion of the stabilizer bar 20f upon the right turning is larger than that upon the left turning. As apparent from the above, the rigidity of the stabilizer bar 20f of the front-wheel-side stabilizer apparatus 14f is made different for different directions of the roll moment. More specifically explained, the stabilizer bar rigidity with respect to the roll moment that acts on the vehicle body upon the left turning is larger than the stabilizer bar rigidity with respect to the roll moment that acts on the vehicle body upon the right turning.

Figure 5:
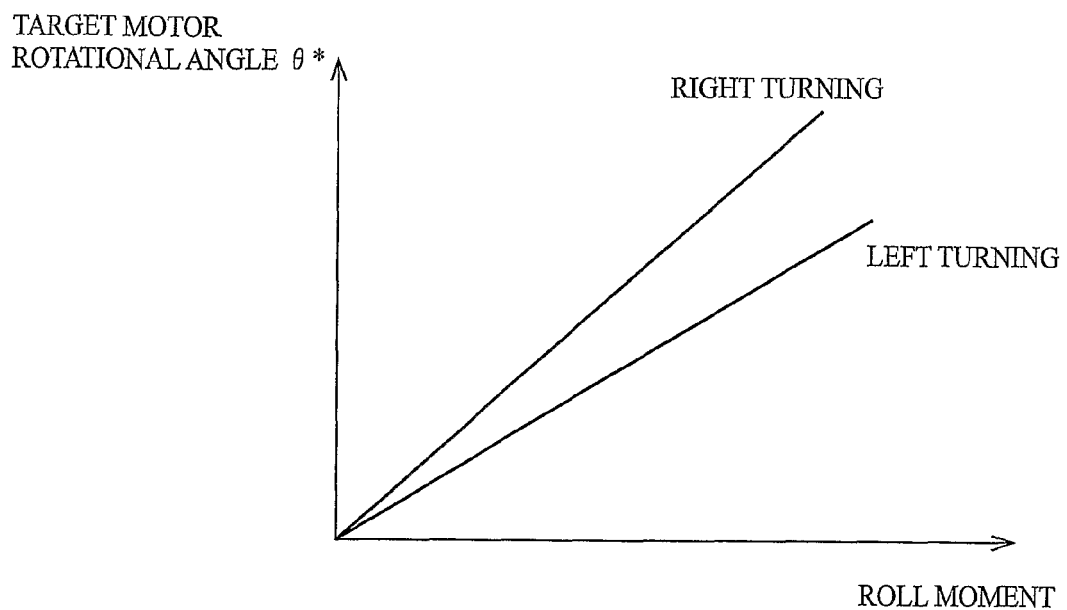
FIG. 5 is a graph schematically showing a target motor rotational angle of an electric motor necessary for the front-wheel-side stabilizer apparatus to exert roll restraining force with respect to the roll moment that a body of the vehicle receives.
Figure 6:
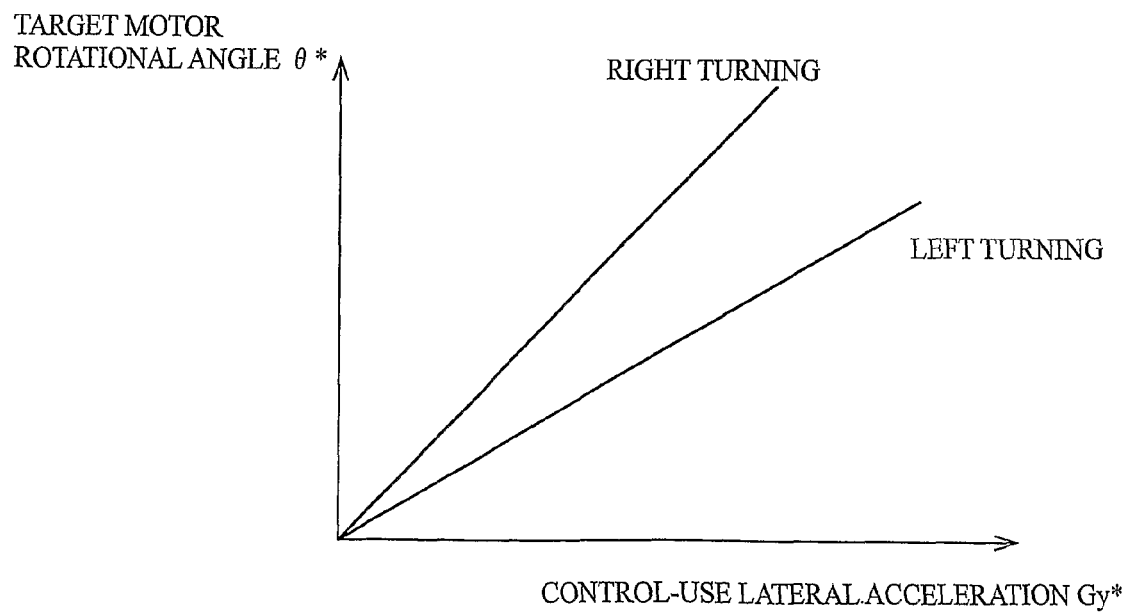
FIG. 6 is a view schematically showing map data for determining the target motor rotational angle of the electric motor in the front-wheel-side stabilizer apparatus, the map data using, as a parameter, lateral acceleration that the vehicle body receives.

As explained above, in the front-wheel-side stabilizer apparatus 14f, the rigidity of the stabilizer bar 20f differs for the different directions of the roll moment that acts on the vehicle body. Accordingly, the rotational position of the actuator 30 required for the front-wheel-side stabilizer apparatus 14f to exert a certain magnitude of roll restraining force needs to be made different depending upon in which direction the actuator 30 is rotated from the neutral position. More specifically described, the degree of the target motor rotational angle θ* with respect to a certain magnitude of roll moment needs to be made larger upon the right turning of the vehicle than upon the left turning of the vehicle, as shown in FIG. 5, for dealing with the different rigidity for the different directions of the roll moment. Accordingly, in the present embodiment, there are prepared, for the front-wheel-side stabilizer apparatus 14f, two sorts of map data (FIG. 6) used for determining the target motor rotational angle θ* based on the control-use lateral acceleration Gy* described above. Depending upon the turning direction of the vehicle, namely, depending upon the direction of the control-use lateral acceleration Gy*, a suitable one of the two map data is selected for determining the target motor rotational angle θ*. In this respect, the motor rotational angle θ, the control-use lateral acceleration Gy, and the roll moment actually become positive or negative depending upon the directions thereof. For the interest of brevity, however, the concept of positive or negative is not considered in FIGS. 5 and 6 and in the above explanation related to those figures, and the explanation is made based on comparison of only the magnitudes or degrees of the motor rotational angle θ, the control-use lateral acceleration Gy, and the roll moment.

In the control explained above, the target motor rotational angle θ* is determined according to the method using the two sort of map data, for making the target motor rotational angle θ* different for the different turning directions. However, the target motor rotational angle θ* may be determined according to methods other than the above. For instance, the target motor rotational angle θ* may be determined in the following manner. There is initially determined a reference target motor rotational angle $\theta_0^*$ according to one map data which is set irrespective of the turning direction of the vehicle and which uses the control-use lateral acceleration Gy* as a parameter. The target motor rotational angle θ* is determined according to the following formula:

$$\theta^* = K \cdot \theta_0^*$$

In this instance, the gain K is selected in accordance with the turning direction of the vehicle, and the target motor rotational angle θ* is determined based on the selected gain K. In detail, where the vehicle is turning left, that is, where the control-use lateral acceleration Gy* is a value in the left turning of the vehicle, the gain K is determined to be $K_L$. On the contrary, where the vehicle is turning right, that is, where the control-use lateral acceleration Gy* is a value in the right turning of the vehicle, the gain K is determined to be $K_R$ ($>K_L$). Thus, the target motor rotational angle θ* may be determined according the method based on the formula indicated above.

iii) Control of the Rear-Wheel-Side Stabilizer Apparatus

As described above, in the rear-wheel-side stabilizer apparatus 14r, the stabilizer bar 20r is configured such that the right and left stabilizer bar members 22r, 24r are generally identical in configuration with each other and such that the actuator 30 is disposed in the vehicle widthwise middle portion. Accordingly, while not shown, the rigidity of the stabilizer bar 20r does not differ depending on the direction of the roll moment that acts on the vehicle body. In the rear-wheel-side stabilizer apparatus 14r, therefore, according to the above-indicated basic control, the target motor rotational angle θ* is determined based on the above-indicated one map data which is set irrespective of the turning direction of the vehicle and which uses the control-use lateral acceleration Gy* as a parameter. Thus, there is executed the control based on the determined target motor rotational angle θ*.

3. Stabilizer Control Programs

Figure 7:
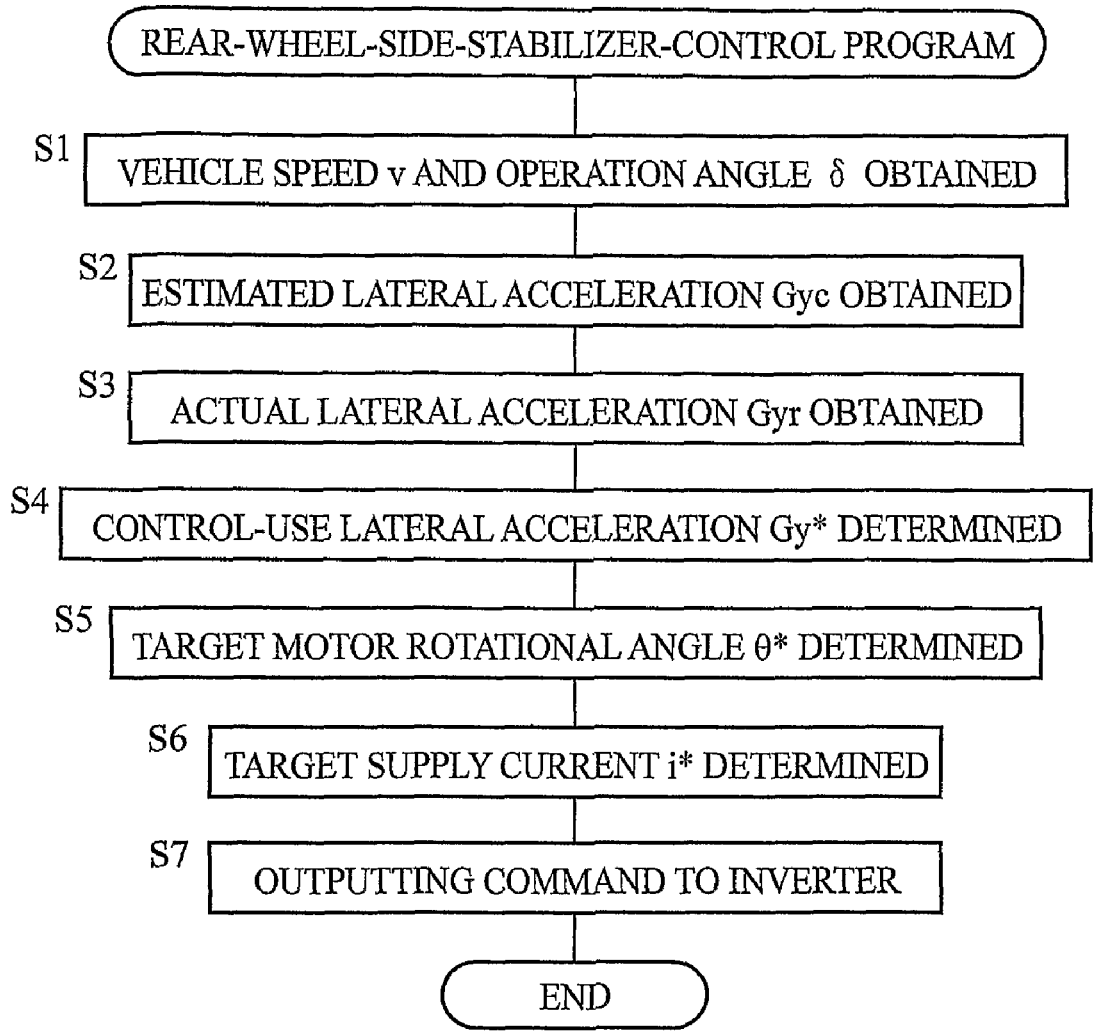
FIG. 7 is a flow chart showing a rear-wheel-side-stabilizer-control program executed in the stabilizer system of FIG. 1.
Figure 8:
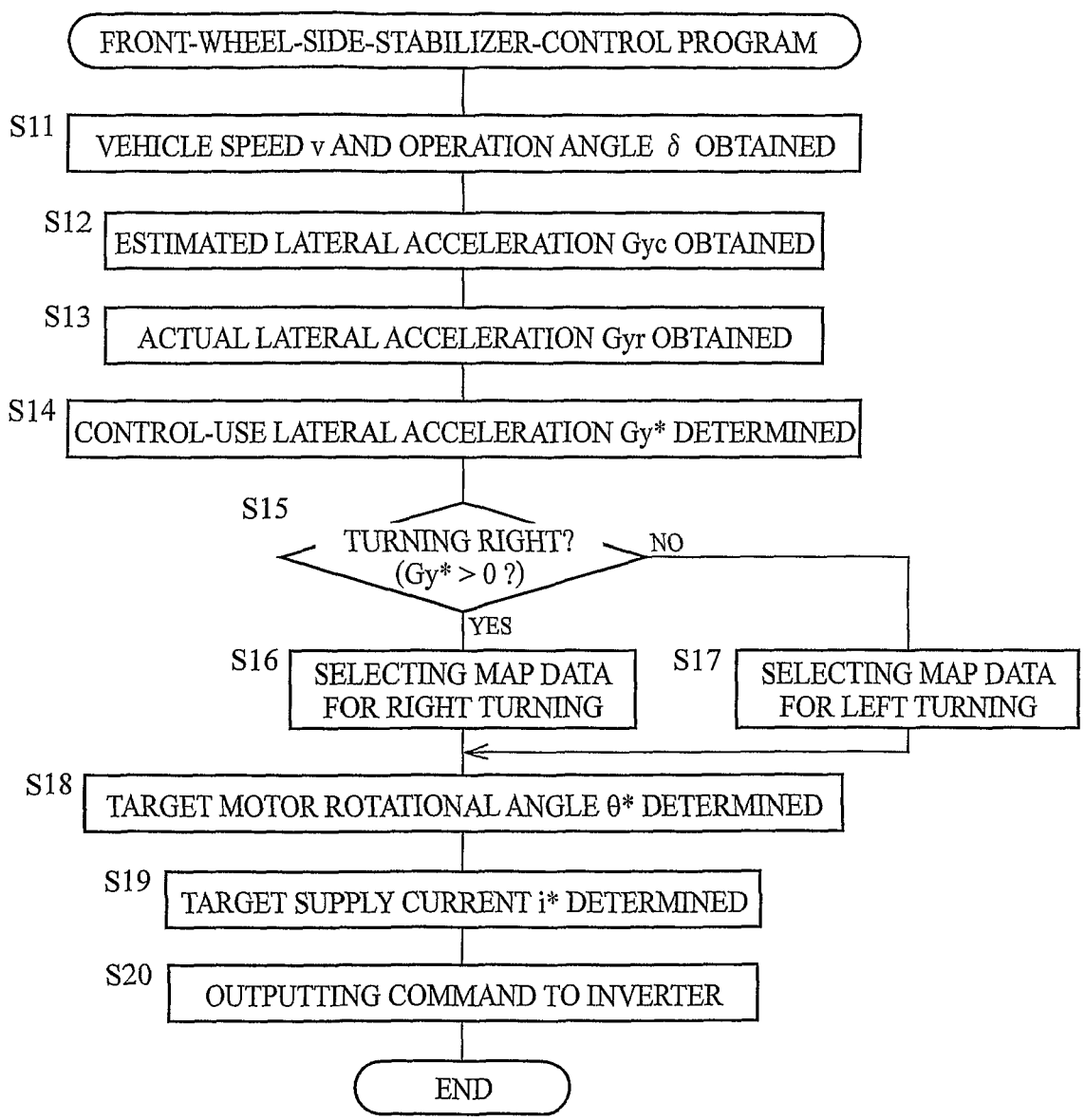
FIG. 8 is a flow chart showing a front-wheel-side-stabilizer-control program executed in the stabilizer system of FIG. 1.
Figure 9:
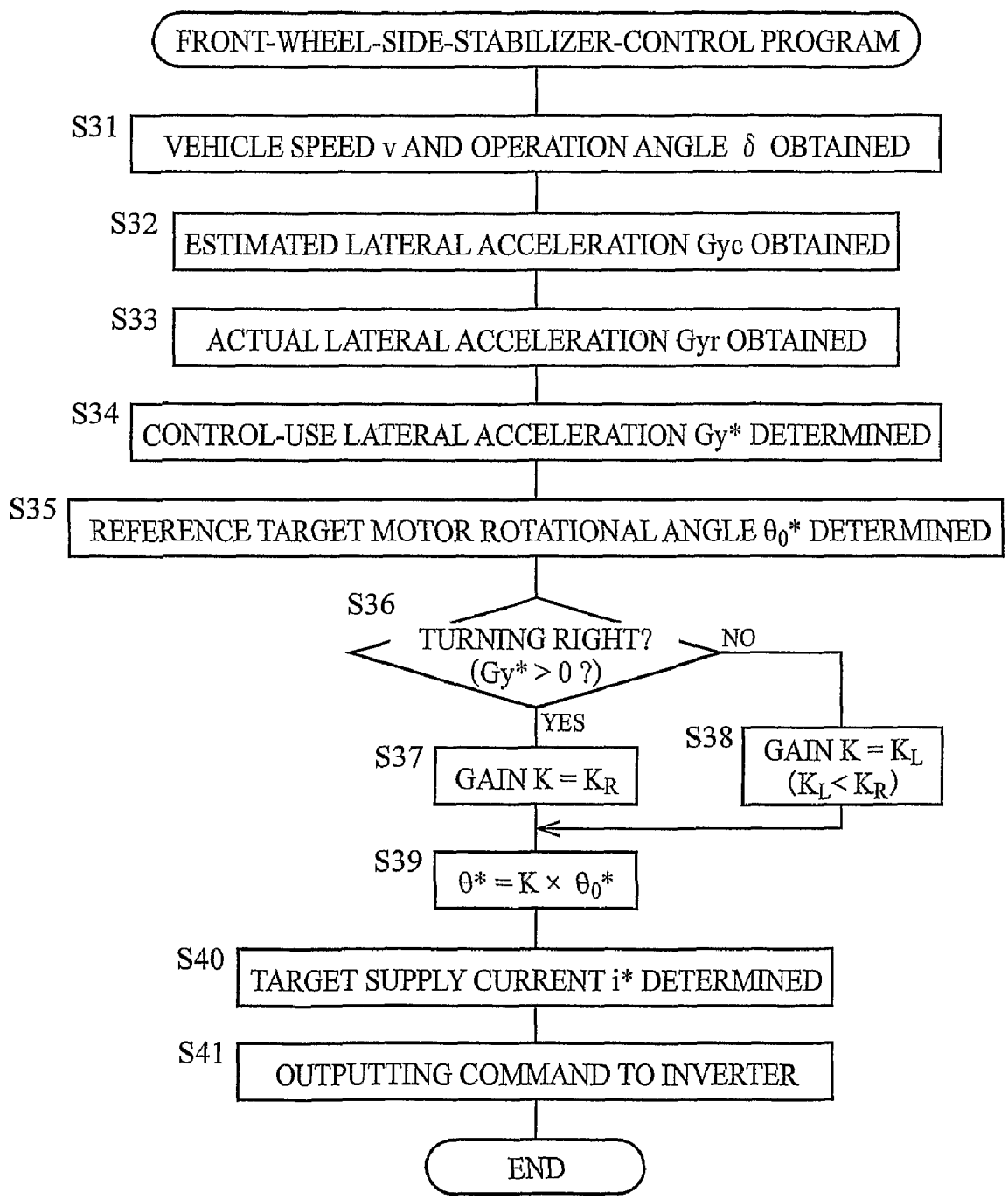
FIG. 9 is a flow chart showing another front-wheel-side-stabilizer-control program executed in the stabilizer system of FIG. 1.

The control in the present stabilizer system 10 is carried out such that stabilizer control programs shown in flow charts of FIGS. 7-9 are repeatedly implemented by the controllers of the respective stabilizer ECUs 111 at short time intervals (e.g., several milliseconds) with an ignition switch of the vehicle placed in an ON state. The flow chart of FIG. 7 is a program to be executed for the rear-wheel side of the vehicle while the flow charts of FIGS. 8 and 9 are programs any one of which is to be executed for the front-wheel side of the vehicle. Hereinafter, there will be explained in detail a flow of the stabilizer control referring to the flow charts. Because the programs for the front-wheel side and the program for the rear-wheel side have a plurality of similar steps in which the processing is similarly executed, the program for the rear-wheel side which is rather simple will be initially explained, and thereafter the programs for the front-wheel side will be explained with the explanation of the plurality of similar steps omitted.

i) Rear-Wheel-Side-Stabilizer-Control Program

In the rear-wheel-side-stabilizer-control program shown in FIG. 7, step S1 (hereinafter "step" is omitted where appropriate) is initially implemented to obtain a vehicle speed v and an operation angle δ of the steering wheel based on values detected by the brake ECU 124 and the steering-angle sensor 120, respectively. Next, S2 is implemented to obtain estimated lateral acceleration Gyc based on the vehicle speed v and the operation angle δ obtained in S1. In the controller of the ECU 111, there is stored map data which relates to estimated lateral acceleration Gyc and which uses vehicle speed v and operation angle δ as parameters. The estimated lateral acceleration Gyc is obtained by referring to the map data. Subsequently, in S3, there is obtained actual lateral acceleration Gyr that is lateral acceleration actually generated in the vehicle body, on the basis of a value detected by the lateral-acceleration sensor 124. Next, in S4, there is determined control-use lateral acceleration Gy* based on the estimated lateral acceleration Gyc and the actual lateral acceleration Gyr. S4 is followed by S5 in which a target motor rotational angle θ* is determined based on the control-use lateral acceleration Gy*. In the controller of the ECU 111, there is stored map data of target motor rotational angle θ* which uses control-use lateral acceleration Gy* as a parameter. The target motor rotational angle θ* is determined in S5 referring to the map data. Then, S6 is implemented to determine a target supply current i* on the basis of motor-rotational-angle deviation Δθ which is deviation of the actual motor rotational angle θ from the target motor rotational angle θ*. S6 is followed by S7 to output, to the inverter of the ECU 111, a command value relating to the determined target supply current i*.

ii) Front-Wheel-Side-Stabilizer-Control Program

FIG. 8 is a flow chart of a front-wheel-side-stabilizer-control program. As in the rear-wheel-side-stabilizer-control program explained above, there are initially executed S11-S14 in the front-wheel-side-stabilizer-control program to determine the control-use lateral acceleration Gy*. S11-S14 respectively correspond to S1-S4 of the rear-wheel-side-stabilizer-control program. Subsequently, S15 is implemented to judge whether the vehicle is turning right. More specifically described, the value of lateral acceleration generated in the vehicle body when the vehicle is turning right is set to be a positive value, and it is judged in S15 that the vehicle is turning right where the control-use lateral acceleration Gy* is larger than 0. Next, in S16, the map data for right turning is selected as map data for determining the target motor rotational angle θ*. On the contrary, where the vehicle is running straightforward or turning left, a negative judgment "NO" is made in S15. In this instance, the map data for left turning is selected in S17.

After the map data is selected in S16 or S17, S18 is implemented to determine the target motor rotational angle θ* on the basis of the control-use lateral acceleration Gy* and the selected map data. Then, S19 is implemented to determine the target supply current i* on the basis of the motor-rotational-angle deviation Δθ which is deviation of the actual motor rotational angle θ from the target motor rotational angle θ*. S19 is followed by S20 to output, to the inverter, a command value relating to the determined target supply current i*.

While there has been explained the control of the front-wheel-side stabilizer apparatus 14f utilizing the two sorts of map data, the target motor rotational angle θ* may be determined using the two gains described above. In this instance, a front-wheel-side-stabilizer-control program indicated by a flow chart of FIG. 9 is executed. In the program shown in FIG. 9, in S31-S35 respectively corresponding to S1-S5 of the rear-wheel-side-stabilizer-control program, the reference target motor rotational angle $\theta_0^*$ is determined. Subsequently, it is determined in S36 whether the vehicle is turning right, as in S15. If it is judged that the vehicle is turning right, S37 is implemented to set the gain K at $K_R$. On the contrary, where the vehicle is not turning right, that is, where the vehicle is at a stop or running straightforward or where the vehicle is turning left, S38 is implemented to set the gain at $K_L$ that is smaller than $K_R$. S38 is followed by S39 to determine, as the target motor rotational angle θ*, a value obtained by multiplying the reference target motor rotational angle $\theta_0^*$ by the gain K, i.e., one of $K_R$ and $K_L$. Subsequently, S40 is implemented to determine the target supply current i*, and then S41 is implemented to output a command value to the inverter.

The invention claimed is:

1. A stabilizer system for a vehicle comprising:
a stabilizer apparatus which includes: a stabilizer bar connected at opposite ends thereof to respective wheel holding members which respectively hold left and right wheels of the vehicle; and an actuator which changes rigidity of the stabilizer bar in accordance with an operational amount of the actuator from a neutral position; and
a control device which determines a target operational amount of the actuator based on a roll-moment-index amount indicative of roll moment that acts on a body of the vehicle,
wherein the stabilizer apparatus has a structure in which a deflection amount of the stabilizer bar is made different for different directions of the roll moment, and
wherein the control device determines the target operational amount based on a direction of the roll moment that acts on the body of the vehicle, such that the target operational amount is made different for different directions of the roll moment that acts on the body of the vehicle and controls an operation of the actuator based on the determined target operational amount in order to reduce a difference between the rigidity of the stabilizer bar to be exhibited with respect to the roll moment in one of the different directions and the rigidity of the stabilizer bar to be exhibited with respect to the roll moment in the other of the different directions, the difference arising from the structure of the stabilizer apparatus.

2. The stabilizer system according to claim 1, wherein the control device determines the target operational amount according to a relationship between roll-moment-index amount and target operational amount, the relationship being set such that a ratio of an increase in the target operational amount to an increase in the roll-moment-index amount is made different based on the direction of the roll moment that acts on the body of the vehicle.

3. The stabilizer system according to claim 1, wherein the control device determines the target operational amount such that a gain used in determining the target operational amount based on the roll-moment-index amount is made different based on the direction of the roll moment that acts on the body of the vehicle.

4. The stabilizer system according to claim 1,
wherein the stabilizer bar includes a pair of stabilizer bar members each of which includes a torsion bar portion disposed on an axis extending in a width direction of the vehicle and an arm portion which extends continuously from the torsion bar portion so as to intersect the torsion bar portion and which is connected at a leading end thereof to a corresponding one of the wheel holding members, and
wherein the actuator rotates the torsion bar portions of the pair of stabilizer bar members relative to each other about the axis and changes the rigidity of the stabilizer bar in accordance with a relative rotational amount of the torsion bar portions of the pair of stabilizer bar members, based on the operational amount.

5. The stabilizer system according to claim 4, wherein the actuator is disposed off-centered in the width direction of the vehicle and the torsion bar portions of the pair of stabilizer bar members have mutually different length values.

6. The stabilizer system according to claim 4, wherein at least one of the torsion bar portions of the pair of stabilizer bar members has a bent portion that is shifted from the axis extending in the width direction of the vehicle and the torsion bar portions have mutually different shapes.

7. The stabilizer system according to any claim 4,
wherein the actuator includes a housing, an electric motor supported by the housing, and a decelerator which is supported by the housing and which is for decelerating rotation of the electric motor, and
wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

8. The stabilizer system according to claim 1, wherein the control device includes a first map data for determining the target operational amount during right turning of the vehicle, and a second map data for determining the target operational amount during left turning of the vehicle.

* * * * *